United States Patent [19]

Murata et al.

[11] Patent Number: 5,040,447
[45] Date of Patent: Aug. 20, 1991

[54] ELECTRONIC STRINGED INSTRUMENT WITH FINGERING OPERATING DATA MEMORY SYSTEM AND NAVIGATE DISPLAY DEVICE

[75] Inventors: Yoshiyuki Murata, Nagatoro; Hajime Manabe, Higashiyamato, both of Japan

[73] Assignee: Casio Computer Co., Ltd., Tokyo, Japan

[21] Appl. No.: 478,066

[22] Filed: Feb. 7, 1990

Related U.S. Application Data

[63] Continuation of Ser. No. 94,402, Sep. 8, 1987, abandoned.

[30] Foreign Application Priority Data

Sep. 10, 1986 [JP] Japan .............. 61-138874[U]
Sep. 10, 1986 [JP] Japan .............. 61-138875[U]
Sep. 10, 1986 [JP] Japan .............. 61-213479

[51] Int. Cl.5 .............. G09B 15/04; G10H 3/18; G10H 7/00
[52] U.S. Cl. .................. 84/612; 84/722; 84/723; 84/477 R
[58] Field of Search .......... 84/612, 636, 723-741, 84/722, 646, 645, 600-609, 477 R, 478

[56] References Cited

U.S. PATENT DOCUMENTS

| | | | |
|---|---|---|---|
| 3,837,256 | 9/1974 | Gullickson | 84/478 |
| 3,854,370 | 12/1974 | Sapinski | 84/485 R |
| 3,943,815 | 3/1976 | Gilbert | 84/267 X |
| 4,178,823 | 12/1979 | McCoskey et al. | 84/DIG. 11 X |
| 4,314,499 | 2/1982 | Olsen | 84/478 X |
| 4,318,327 | 3/1982 | Toups | 84/477 R |
| 4,336,734 | 6/1982 | Polson | 84/DIG. 30 X |
| 4,723,468 | 2/1988 | Takabayashi et al. | |
| 4,730,530 | 3/1988 | Bonanno | 84/1.16 |
| 4,748,887 | 6/1988 | Marshall | 84/1.15 |
| 4,760,767 | 8/1988 | Tsurubuchi | |
| 4,882,965 | 11/1989 | McClish | 84/477 R X |

FOREIGN PATENT DOCUMENTS

| | | |
|---|---|---|
| 55-55398 | 4/1980 | Japan . |
| 55-152597 | 11/1980 | Japan . |
| 61-26090 | 2/1986 | Japan . |
| 62-47698 | 3/1987 | Japan . |

*Primary Examiner*—Stanley J. Witkowski
*Attorney, Agent, or Firm*—Frishauf, Holtz, Goodman & Woodward

[57] ABSTRACT

In an electronic stringed instrument, when a fingered string is plucked, the initiation of vibration of the plucked string is detected by a string vibration sensor to generate timing data representing the vibration initiation timing and number data representing the number of the string which is vibrated. Every time the timing data is obtained, pitch data, timing data and number data are respectively stored in the memory.

61 Claims, 11 Drawing Sheets

| NOTE CODE (CHORD CODE) | TONE LENGTH CODE | PICKING DATA (ARPEGGIO) |
|---|---|---|
| Am | ♩ | UP  DOWN |
| cth | ♪ | UP  DOWN |
| C3 | ♪ | UP  DOWN |
| | | |
| | | UP  DOWN |

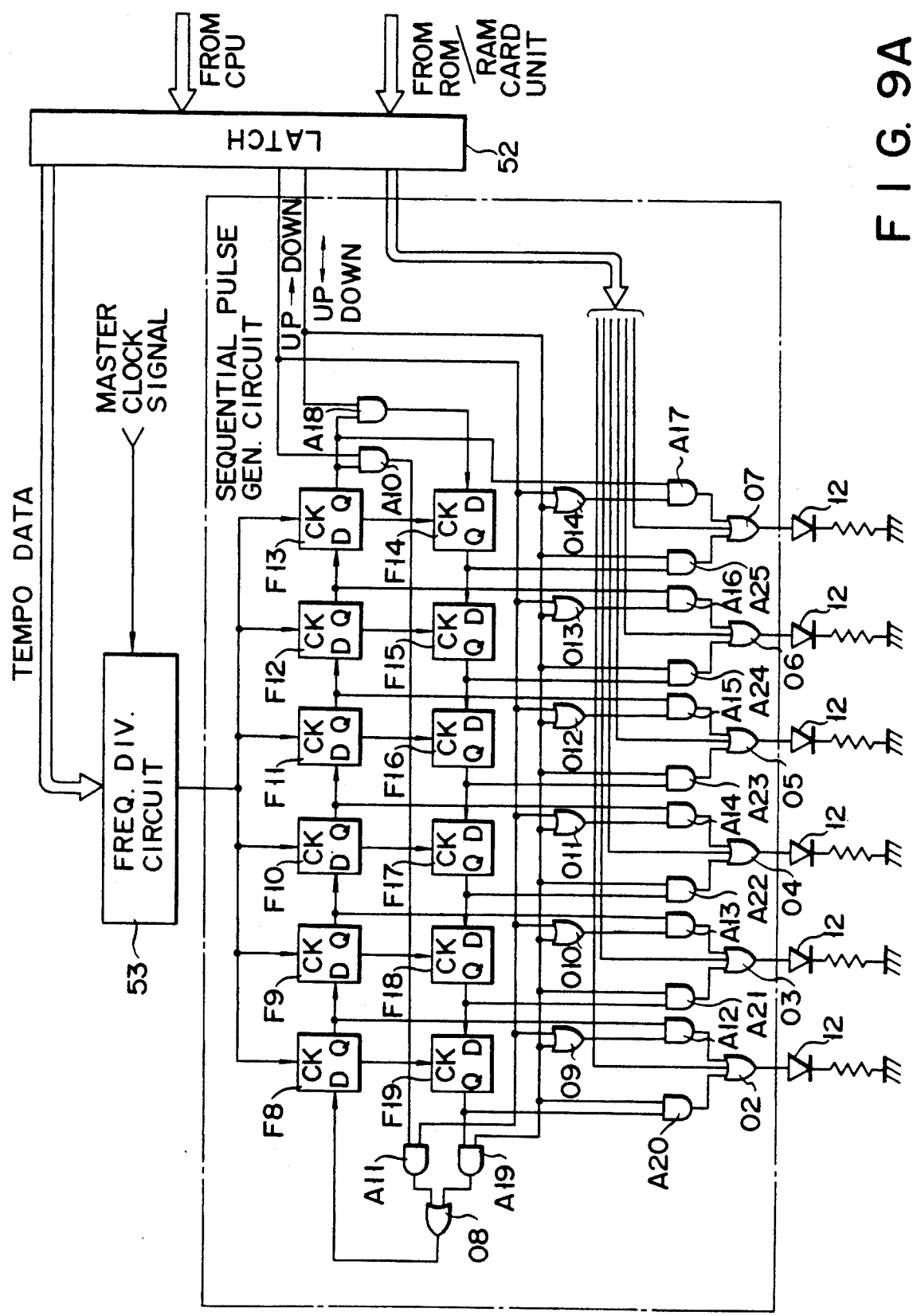

ELECTRONIC STRINGED INSTRUMENT WITH FINGERING OPERATING DATA MEMORY SYSTEM AND NAVIGATE DISPLAY DEVICE

This application is a continuation of application Ser. No. 07/094,402, filed Sept. 8, 1987, and now abandoned.

BACKGROUND OF THE INVENTION

In recent times, various electronic musical instruments have been developed which utilize advances made in electronic technology. Among these electronic musical instruments are electronic stringed instruments such as electronic violins, electronic guitars, and guitar synthesizers, as well as electronic keyboard instruments such as electronic pianos and electronic organs.

An electronic stringed instrument is usually played by designating a desired pitch with a finger, while picking strings with another finger, thereby producing a desired musical sound. Consequently, more advanced performance techniques are required on the part of the player than in the case of playing an electronic keyboard instrument. In particular, when playing a guitar, in order to quickly and reliably produce a number chords which occur frequently in a piece of music, a plurality of strings have to be picked while a corresponding number of strings are simultaneously held depressed. Since it is extremely difficult to master such advanced performance techniques by self-teaching, it is therefore necessary for the player to receive special training or personal teaching from a qualified teacher.

A musical instrument training device is disclosed in U.S. Pat. Specification No. 4,286,495. In this device, when a chord name, e.g., Am or C$_7$, is designated by selectively operating a chord selection switch provided on a guitar body, one of a plurality of LEDs (light-emitting diodes) provided on respective fret positions on a fingerboard, i.e., a LED provided at fret positions corresponding to the designated chord name, is turned on to designate the fret positions at which strings are to be held depressed.

In this disclosed training device, however, only a fret position corresponding to a selectively operated chord selection switch is designated with the turning-on of the LED provided at the corresponding fret position. In other words, it is not possible to display the finger operating position, finger operating order, finger operating direction, etc. with the progress of music being played. Further, with regard to the training device noted above, no judgment is made on whether strings have been correctly depressed by the player at the position, at which LEDs corresponding to the chord name selected by a chord selection switch are indicated. This means that the device is inadequate as a means of training a player, since it does not check as to whether strings are correctly depressed at the position at which an LED is turned on.

Japanese Patent Laid-Open 54-161924 discloses an electronic stringed instrument, in which pitch data, corresponding to a fret position, at which strings are being depressed, is stored in advance, the stored pitch data being then read out and sounded for every picking of the strings. As a result, it is possible to sound musical notes of desired pitches at desired timings.

With this electronic stringed instrument, however, tone length data is not stored in addition to the tone pitch data. More particularly, when an actual performance is made, the performance content is not stored in real time. Consequently, it is not possible to reproduce the performance content in the same manner in which it was played. This means that it is not possible to improve the playing techniques by finding mistakes in the playing for instructional purposes while reproducing the stored performance. Further, with this electronic stringed instrument, navigation display is not made on the basis of the stored pitch data. Therefore, training of playing techniques can not be made with this stringed instrument.

SUMMARY OF THE INVENTION

This invention has been developed with the intention of solving the various problems, noted above, associated with the prior art. An object of the invention, accordingly, is to provide an electronic stringed device, which permits navigation display of at least either operating position, operating order, operating direction or operating tempo of the play in timed relation to the progress of a piece of music being played, so that it is possible to expect improvement of the player's technique to be attained reliably in a short period of time.

Another object of the invention is to provide an electronic stringed instrument, which permits a performance to be stored in real time and the stored performance to be reproduced in real time so that it is possible to find mistakes in the performance for instructional purposes while checking contents of performance.

A further object of the invention is to provide an electronic stringed instrument, in which the operation contents of the performance by the performer are stored in real time, and the particular notes to be played, in order, are displayed by navigation display in a timed relation to the progress of the stored "correct" performance.

BRIEF DESCRIPTION OF THE DRAWINGS

FIG. 9A is a view showing an electronic circuit of a trigger LED section;

DETAILED DESCRIPTION OF THE PREFERRED EMBODIMENTS

Now, an embodiment of the invention will be described in detail with reference to the accompanying drawings.

CONSTRUCTION

Figure 1:
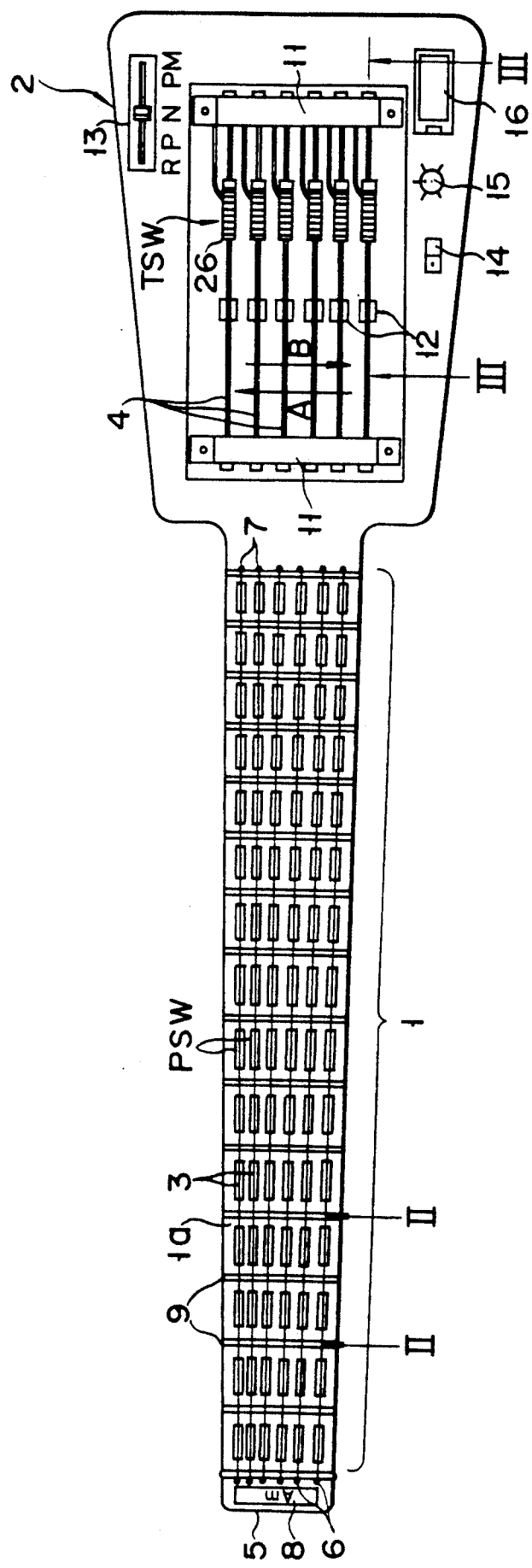
FIG. 1 is a plan view showing an embodiment of the electronic stringed instrument according to the invention.

FIG. 1 is a plan view showing an electronic stringed instrument according to the invention. The stringed instrument consists of neck 1 and body 2. Neck 1 has fingerboard 1a. Six fret strings 3 are stretched along fingerboard 1a for guiding fingers to desired fret positions at the time of the fingering. Six trigger strings 4 are also stretched along barrel 2 to be operated during a performance.

Fret strings 3 each have one end secured for adjustment to peg 6 provided on head 5 of neck 1 and the other end secured to peg 7 provided adjacent to a juncture portion between fingerboard 1a and body 2. Head 5 of neck 1 is provided with LCD section 8, on which chord names, e.g., Am, C7, etc., and note names, e.g., C, A, etc., are displayed.

16 frets 9 are provided at predetermined intervals on fingerboard 1a. Pitch designation switches PSW are provided between adjacent frets 9 on fingerboard 1a corresponding to each individual fret string 3. In this instrument, 15 (number of spaces between adjacent frets 9) by 6 (number of trigger strings), i.e., 90, pitch designation switches PSW are provided. Fret LEDs 10 (shown in FIG. 2) are provided above each of the pitch designation switches PSW. Fingering positions corresponding to pitch designation switches PSW to be operated are shown visually with the turning-on of fret LEDs 10.

The six trigger strings 4 are stretched between bridges 11 provided in a spaced-apart relation on body 2 with their opposite ends secured to bridges 11. Six trigger switches TSW are provided, each at one end of each trigger string 4. Six trigger LEDs 12 are provided on body 2, under the central portion of each trigger string 4. With selective turning-on of trigger LEDs 12, for the strings among six trigger strings 4 to be picked, the direction of picking or tempo of picking is shown visually. As for picking techniques, there are down-picking, in which the trigger strings 4 are picked in the downward direction of arrow A, up-picking in which the trigger strings 4 are picked in the upward direction of arrow B, and alternate picking, in which down-picking and up-picking are repeated alternately. For the tempo of picking, there are double times and triple times.

Body 2 is provided with mode switch 13, power switch 14, tempo knob 15 and cassette setting section 16. Mode switch 13 is used for switching the play mode of the electronic stringed instrument to a recording mode, a playback mode, a navigation mode, a picking mode and a metronome mode. The recording mode is set for recording the fingering and picking in a real time recording section. The playback mode is set for playing back the performance recorded in the real time recording section. The navigation mode is set for indicating fingering positions of pitch designation switches PSW to be operated while selectively driving fret LEDs 10, and trigger LEDs 12 for indicating which of trigger strings 4 should be picked, and in what order. The picking mode is set for indicating the direction of picking of trigger strings 4 by selective driving of trigger LEDs 12. The metronome mode is set for indicating the tempo of play while driving trigger LEDs 12 in reciprocal directions in a timed relation to a preset tempo as in the case of the alternate picking. Power switch 14 is for turning off the power source. Tempo knob 15 is operated for selecting the tempo. In the card setting section 16, ROM card 17, on which play data has been recorded, or RAM card 17, on which play data of a performance by a performer has been recorded in real time, is set.

CONSTITUTION OF PITCH DESIGNATION SWITCHES PWS

Figure 2:
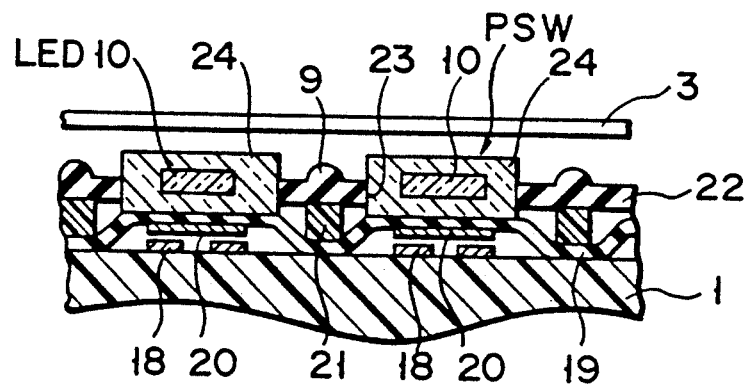
FIG. 2 is an enlarged-scale sectional view taken along line II—II in FIG. 1.

FIG. 2 is a fragmentary sectional view of neck 1. Pitch designation switches PSW are inlaid in neck 1. These pitch designation switches PSW each consist of fixed contact 18 and variable contact 20. Fixed contact 18 is secured to the under-side of flexible sheet 19 provided over the entire surface of fingerboard 1a. Flexible sheet 19 consists of rubber and elastic plastic material. Flexible sheet 19 has raised portions each corresponding to each fixed contact 18, and movable contact 20 is mounted on the underside of each raised portion. Spacers 21 are provided in portions on flexible sheet 19 other than the raised portions. Protective plates 22 are secured to the top of spacers 21. Frets 9, described above, are each provided on protective plate 22 right above spacer 21. Protective plate 22 is formed with holes 23 in rows of six holes each provided between adjacent frets 9. Transparent key top 24 is fitted for vertical movement in each hole 23. When key top 24 is pushed down together with fret string 3, movable contact 20 of flexible sheet 19 is selectively brought into contact with fixed contact 18. As a result, a corresponding pitch designation switch PSW is turned on, and a pertinent pitch designation signal is supplied to a CPU, to be described later.

In each key top 24, fret LED 10, described above, is accommodated. A turn-on signal is supplied to fret LED 10 from a conductive line (not shown) formed on the upper surface of flexible sheet 19 or lower surface of protective plate 22. According to this turn-on signal, each fret LED 10 is selectively driven to emit light indicating a fingering position of a pitch designation switch PSW to be operated. Fret strings 3 are not essential and may be omitted.

CONSTITUTION OF TRIGGER SWITCHES TSW

Figure 3:
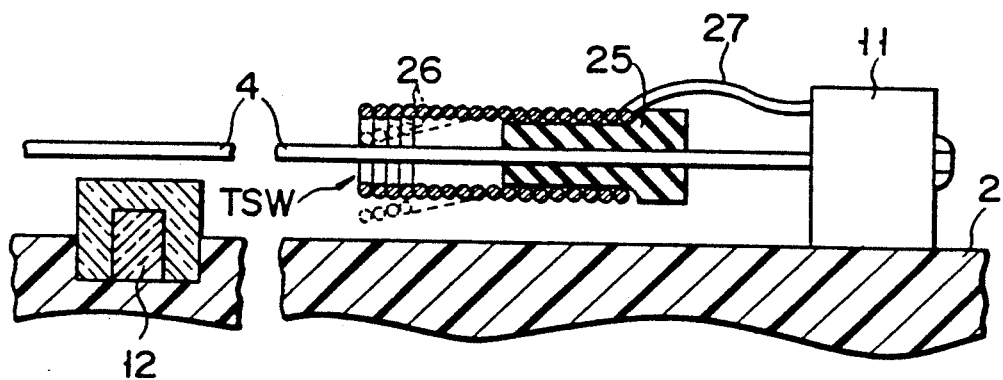
FIG. 3 is an enlarged-scale sectional view taken along III—III in FIG. 1.

FIG. 3 is a sectional view showing trigger switch TSW and trigger LED 12, noted above. Trigger switch TSW consists of conductive trigger string 4 constituting one contact member, conductive coil spring 26 constituting the other contact member, and insulating member 25 for electrically insulating trigger string 4 and coil spring 26 from each other. Trigger switch TSW is coupled to each of six trigger strings 4. The construction of the trigger switch TSW will now be described in detail. Cylindrical insulating member 25 is secured to conductive trigger string 4. A stem portion of conductive coil spring 26 is fittedly supported on the outer periphery of insulating member 25. While trigger string 4 is stationary, the free end of coil spring 26 is spaced apart from conductive trigger string 4, so that trigger switch TSW remains "off". When trigger string 4 is operated, i.e., when trigger string 4 is pulled from the stationary state and then released, the free end of coil spring 26 is brought into electric contact with trigger string 4, as shown by dashed lines in FIG. 3, for it can no longer follow the movement of trigger string 4. Thus, trigger switch TSW is turned on. Part of coil spring 26 is pulled out to the outside from its stem portion and connected to input section 31 to be described later. Through this coil spring 26, an "on" signal of trigger switch TSW is transmitted as musical sound trigger data to input section 31.

Trigger LEDs 12, noted above, are provided on body 2 under the central portion of trigger strings 4. The order of trigger strings 4 to be picked, the direction of picking or tempo of picking is indicated by the turning-on of trigger LEDs 12.

CONSTITUTION OF ENTIRE CIRCUIT

Figure 4:
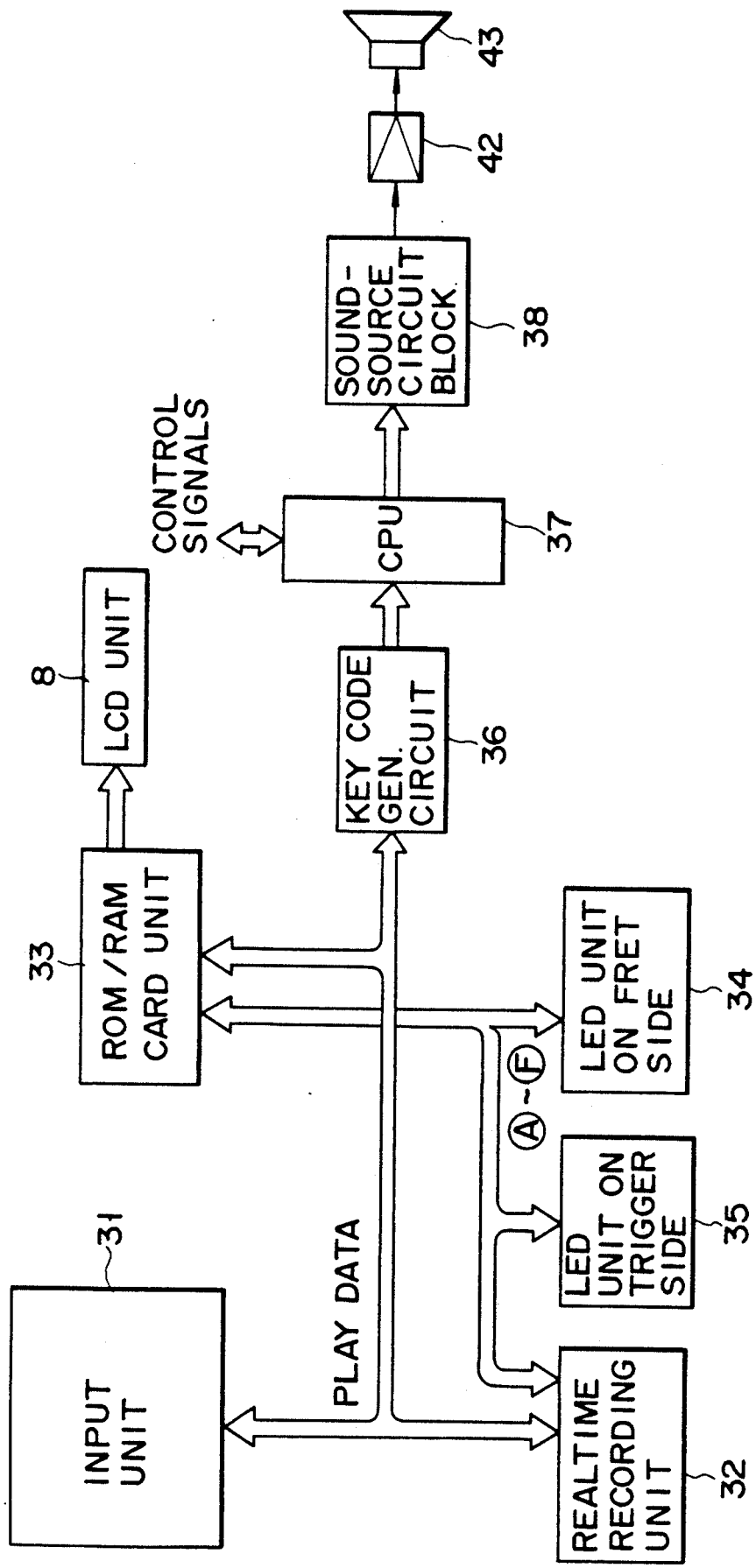
FIG. 4 is a block diagram showing the electronic circuitry used in accordance with the invention.

FIG. 4 is a block diagram showing the circuit construction of the electronic stringed instrument according to the invention. Input section 31 consists of a plurality of pitch designation switches PSW for producing pitch designation signals FC and six trigger switches TSW for producing musical sound trigger signals Ts. Play data is constituted by pitch designation signals and musical sound trigger signals provided from input section 31. In the recording mode, the play data is written in the form of note code, tone length code and picking data in ROM/RAM card 17 in ROM/RAM card section 33 under write control of real time recording section 32. In this case, write address data is supplied from real time recording section 32 to ROM/RAM card section 33.

In the navigation mode and metronome mode, play data stored in ROM/RAM card 17 of ROM/RAM card section 33 is read out. The note code of the play data is supplied to LCD section 8, fret LED section 34 and trigger LED section 35. According to the note code supplied to LCD section 8, corresponding note name and chord name are displayed on LCD section 8. According to the note code supplied to fret LED section 34 and trigger LED section 35, corresponding fret LEDs 10 and trigger LEDs 12 are turned on to indicate the order of fingering positions of pitch designation switches PSW and direction of picking.

In the recording mode or navigation mode, the play data provided from input section 31 in response to the pitch designation operation on finger-board 1a and musical sound trigger designation operation on trigger strings 4 is converted through key code generation circuit 36 into corresponding key code. The key code thus generated is supplied through CPU 37 to sound source circuit block 38, which generates a corresponding musical tone to be generated. In the playback mode, the play data read out from ROM/RAM card 17 in ROM/RAM card section 33 is converted through key code generation circuit 36 into a corresponding key code. The key code is supplied through CPU 37 to sound source circuit block 38 for generating and sounding the corresponding musical tone. CPU 37 supplies various control signals to the circuit shown in FIG. 4.

CONSTITUTION OF INPUT SECTION 31

Figure 5A:
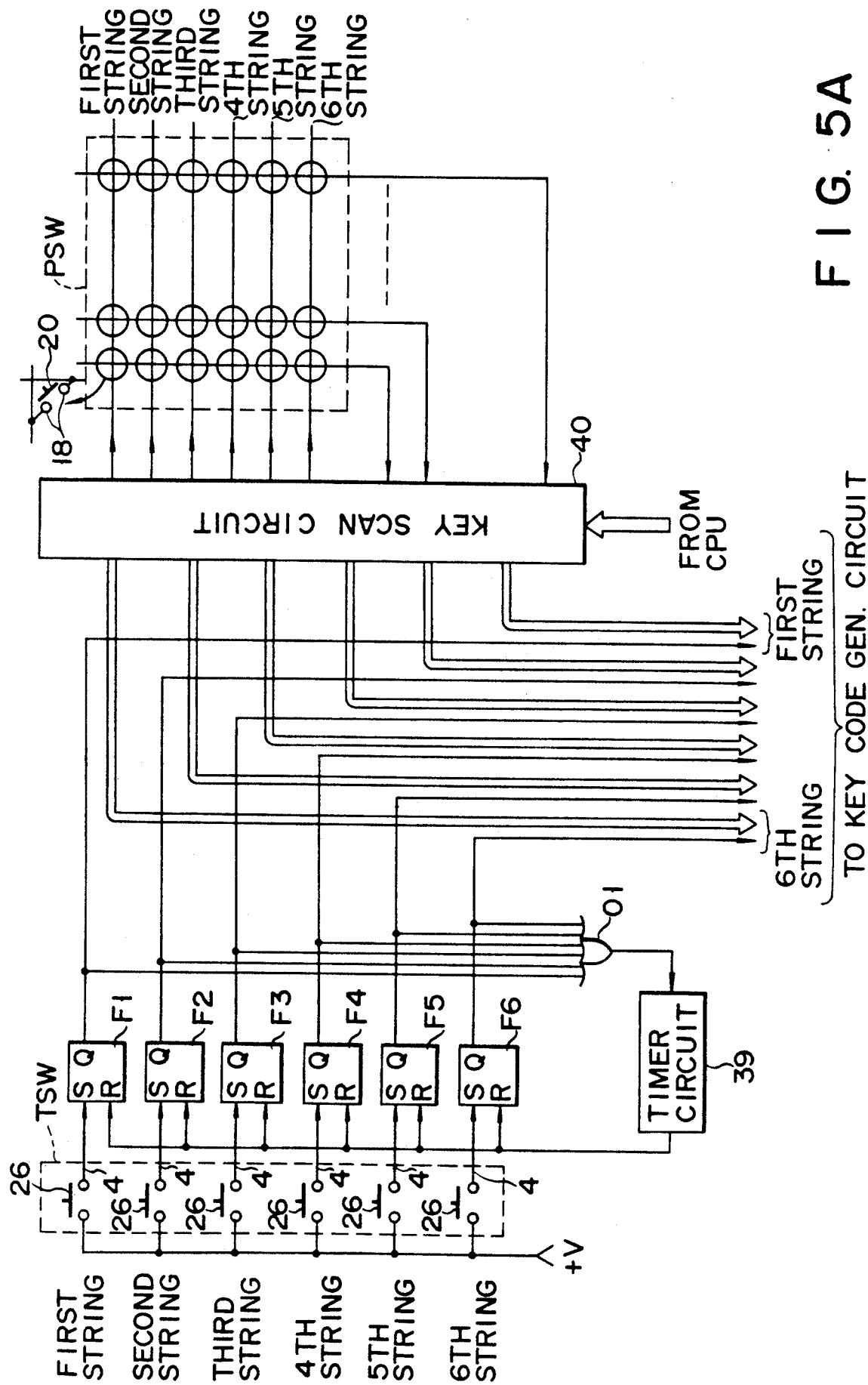
FIG. 5A is an electronic circuit diagram showing an input section, e.g., string operation data input section.

FIG. 5A shows a specific construction of input section 31.

Figures 5B, 6:
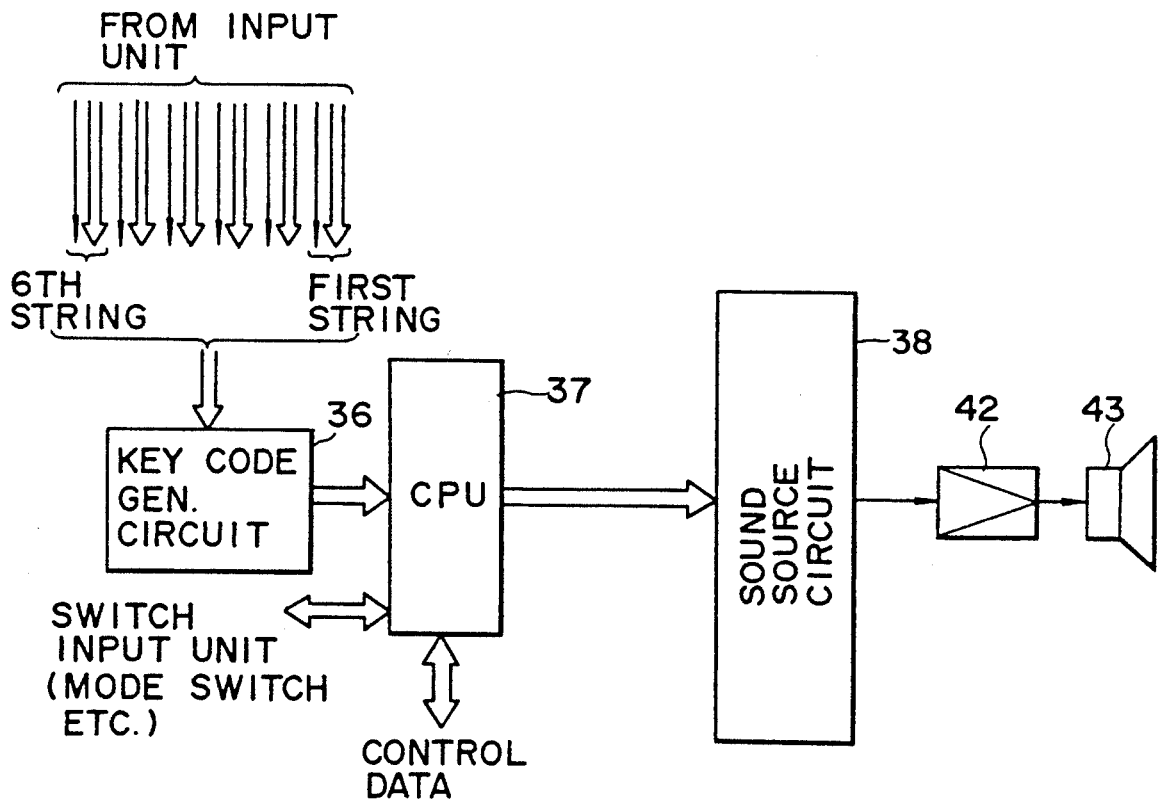
FIG. 5B is a view showing contents of fret codes corresponding to respective fret positions.
FIG. 6 is a block diagram showing the periphery of the CPU and the sound source circuit.

Input section 31 consists of trigger switches TSW and pitch designation switches PSW. An "on" signal supplied from trigger switches TSW is supplied as set (S) signal in RS-type flip-flops F1 to F6. The Q output of flip-flops F1 to F6 is provided as musical sound trigger signal. The Q output of each of flip-flops F1 to F6 is supplied through OR gate 01 to timer circuit 39 as driving start signal to start driving of timer circuit 39. A time-up signal provided from timer circuit 39 after time counting is supplied as reset (R) signal to each of flip-flops F1 to F6. Thus, the "on" signal supplied from trigger switches TSW to flip-flops F1 to F6 is sampled for every timer time. This is done so in order to prevent unnecessary generation of musical sound trigger signal due to turning-on of trigger switches TSW a plurality of times at the time of one picking operation on trigger strings 4. In other words, this is done in order to prevent chattering. Therefore, even if the same "on" signal of trigger switch TSW is supplied consecutively during the time counting of the timer circuit 39 so that a driving start signal is supplied to timer circuit 39, timer circuit 39 can continue the counting. This, an "on" signal of trigger switch TSW supplied to each of flip-flops F1 to F6 during the time counting of timer circuit 39 is a signal supplied simultaneously with the "on" signal of this time and is dealt with as an ineffective trigger signal. The trigger signal supplied from the same trigger switch TSW after completion of the time counting of timer circuit 39 is processed as an effective musical sound trigger signal. It is thus guaranteed that when one picking operation is executed, the first trigger signal is supplied as an effective musical sound trigger signal to CPU 37. It is detected as pitch designation signal Fc according to a key sampling signal from key scan circuit 40 controlled by CPU 37. This pitch designation signal Fc is provided as a fret code from key scan circuit 40. This fret code is expressed as 4-bit digital data, as shown in FIG. 5B. The fret code can assume values from "0000" (indicating the open fret string position) to "1111" (indicating the fifteenth fret position) for digitally expressing each fret position from the open string fret position to the sixteenth fret position.

CONSTRUCTION OF PORTION FOR GENERATING AND SOUNDING MUSICAL TONES

The musical tone generating/sounding section sound source circuit 38 for generating a musical sound signal according to a key code, an amplifier 42 and a loudspeaker 43 for amplifying and sounding a musical sound signal provided from sound source circuit 38.

The musical sound trigger signal and fret code from input section 31 are supplied to a key code generation circuit 36. Key code generation circuit 36 converts the fret code to a corresponding key code for every timing of input of musical sound trigger signal. This key code is supplied through CPU 37 to sound source circuit block 38. Sound source circuit 38 generates a corresponding musical sound signal. This musical sound signal is amplified through amplifier 42 and sounded from loudspeaker 43.

The state of operation of mode switch 13 and tempo knob 15 on body 2 is detected by CPU 37. The result of detection is provided as various control data from CPU 37.

CONSTITUTION OF ROM/RAM CARD SECTION 33

Figure 7A:
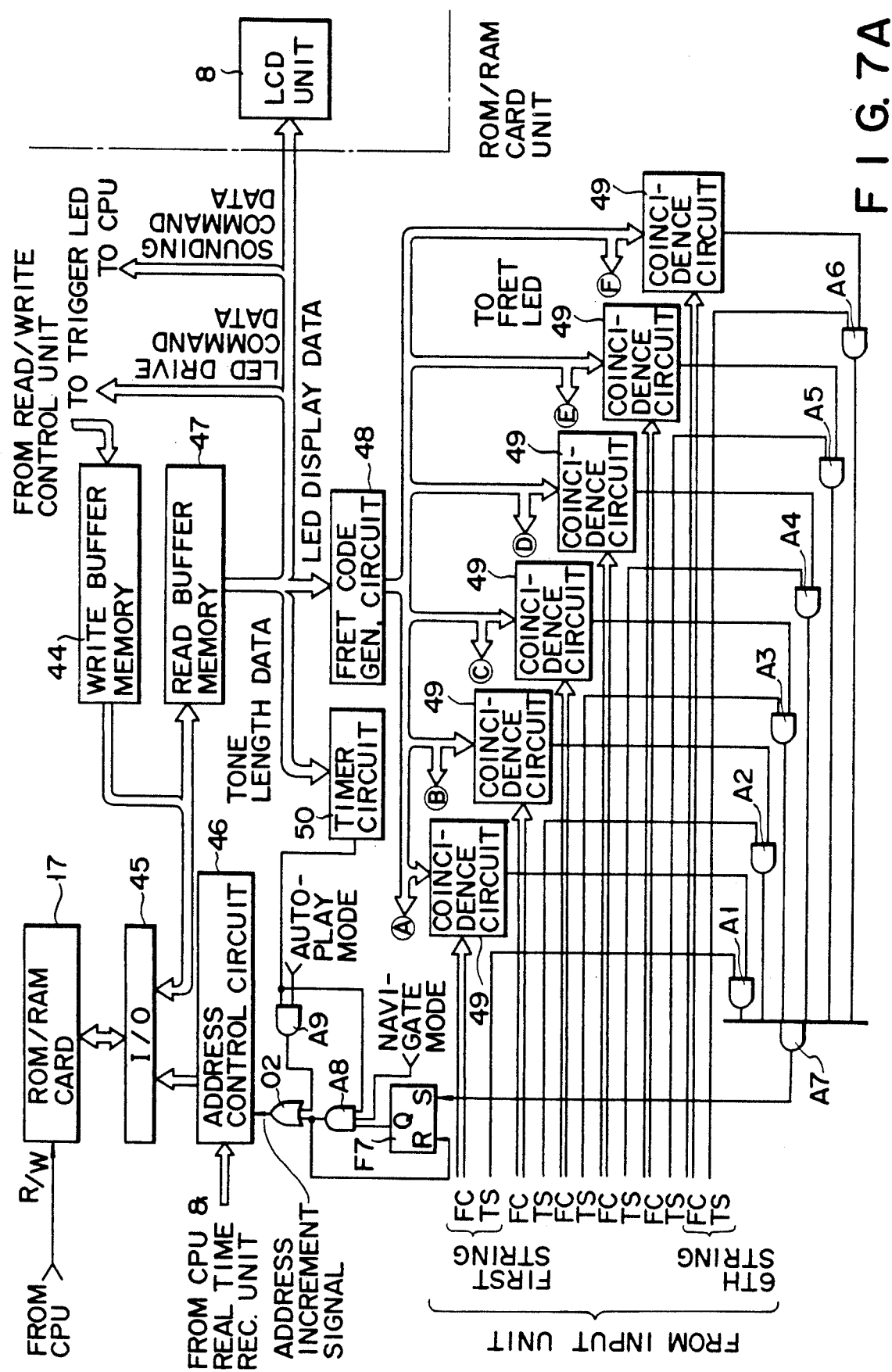
FIG. 7A is a block diagram showing a ROM/RAM card section.

FIG. 7A shows the construction of ROM/RAM card section 33.

ROM/RAM card section 33 comprises ROM/RAM card 17 including a portion where play data has been stored in advance and a portion where play data can be stored in real time, address control circuit 46 for effecting address control by reading out play data from ROM/RAM card 17, write buffer memory 44 and read buffer memory 47. ROM/RAM card 17 is used for the recording mode, playback mode (i.e., automatic play mode), navigation mode, picking mode and metronome mode.

When the Recording Mode is Set

Figures 7B, 9B:
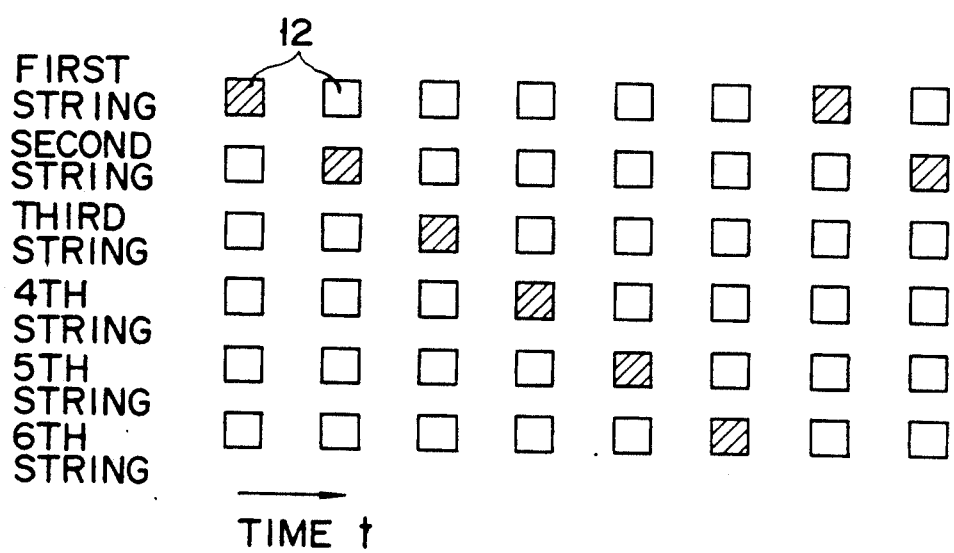
FIG. 7B is a view showing data contents of a ROM/RAM card.
FIG. 9B is a view showing the manner of change in the display of trigger LEDs during down-picking play.

Data of actual play by a performer is supplied from input section 31 to real time recording section 32. The play data (i.e., note code, interval code and picking data) supplied to a read/write control section (to be described later) in real time recording section 32 is once set in write buffer memory 44 and is then written through interface 45 into ROM/RAM card 17. FIG. 7B shows the contents of play data written in the ROM/RAM card. In this case, address control circuit 46 is controlled by real time recording section 32. A write address signal provided from address control section 46 is supplied through interface 45 to ROM/RAM card 17.

When the Navigation, Picking and Metronome Modes are Set

The play data sorted in ROM/RAM card 17 is read out by the action of address control circuit 46. In the navigation, picking and metronome modes, the play data read out from ROM/RAM card 17 is supplied to fret side LED section 34 and trigger LED section 36, whereby the fingering position of fret strings 3, the order of operation of trigger strings 4, the direction of operation and the tempo of operation are indicated by selective turning-on of LEDs 10 and 12 by the action of LED sections 34 and 35. The note code that is contained in the play data string codes "000" to "110" digitally expressing the first to the sixth ones of trigger strings 4 and fret codes "0000" to "1111" digitally expressing the open string fret position and the first to the fifteenth fret position as shown in FIG. 5B. The note code (string code and fret code) is supplied to fret LED section 34, but only the string code is supplied to trigger LED control section 35. This data configuration is by no means limiting, and it is possible to adopt any other suitable data configuration.

The note code and picking data read out from read buffer memory 47 are supplied as display data of each fret LED 10 to fret code generation circuit 48. Fret code generation circuit 48 extracts only the fret code corresponding to each fret position, as shown in FIG. 5B. The fret code is supplied to coincidence circuits 49 for respective six strings, i.e., first to sixth fret strings 4. The allotment of fret codes to coincidence circuits 49 is done according to the string code in the note code. To coincidence circuits 49 is also supplied the fret code supplied from input section 31. When the fret code provided from ROM/RAM card 17 and fret code provided from input section 31 coincide, i.e., when a pitch designation switch PSW belonging to the fret position corresponding to the turned-on fret LED 10 is operated, a coincidence signal is supplied through AND gates A1 to A6 to AND gate A7. AND gates A1 to A6 are enabled by "on" signals from trigger switches TSW corresponding to picking operation of each trigger string 4. Coincidence circuits 49 effect coincidence judgment with respect to any open string condition where a corresponding fret 9 is not depressed. When coincidence of both fret codes is obtained for all the strings and corresponding trigger switches TSW are turned on, an all string coincidence signal is supplied as a set (S) signal from AND gate A7 to RS-type flip-flop F7. The Q output of flip-flop F7 is supplied as an enable signal to AND gate A8.

To AND gate A8 is also supplied as an enable signal a navigation mode signal when the navigation mode is set by mode switch 13. The tone length code read out from read buffer memory 47 is set in timer circuit 50, which executes time counting according to the tone length code. A time-up signal provided from timer circuit 50 after the time counting is supplied through AND gate A8 and OR gate 02 to address control circuit 46. The read address of ROM/RAM card 17 is incremented by the time-up signal.

Thus, in the navigation mode, when and only when the tone length corresponding to the tone length code has passed from the instant of the reading of play data of this time from read buffer memory 47 and accurate picking of trigger strings is done with depression of correct fingering position, the reading of the next play data is performed. The coincidence of this play data and play data from input section 31 is done by coincidence circuits 49. The output of AND gate A8 is supplied as reset (R) signal to flip-flop F7. Thus, flip-flop F7 waits for the coincidence signal based on the next play.

The time-up signal from timer circuit 50 is supplied through address control section 46 through AND gate A9 and OR gate 02. The read address of ROM/RAM card 17 is incremented by an address control signal supplied from address control section 46. As a result, the next play data is read out.

When the Playback Mode is Set

At the time of the playback mode (i.e., automatic play mode), the play data read out from ROM/RAM card 17 is supplied to CPU 37, and according to the play data musical sounds are produced from sound source circuit block 38. In this case, during a period from an instant when play data has been read out from ROM/RAM card 17 according to a time-up signal supplied from timer circuit 50 until the next time-up signal is supplied from timer circuit 50 to AND gate A8, even if coincidence signal is supplied from coincidence circuits 49 through AND gates A7 to flip-flop F7, no address increment signal is supplied through AND gates A8 and A2 to address control circuit 46. This is made so in order that no address increment signal is supplied to address control circuit 46 even if trigger strings 4 are picked several times in the correctly operated state.

An automatic play mode signal to AND gate A9 is also supplied as an enable signal when mode switch 13 is set to the playback mode (i.e., automatic play mode). Thus, in the automatic play mode, the reading of the next play data is done automatically every time when the time interval has passed, and automatic play is obtained in this way.

The play data read out from ROM/RAM card 17 is once set in read buffer memory 47, and the note code in the play data is subsequently supplied to LCD section 8, on which the chord name or note name is displayed.

FIG. 7B shows the contents of play data stored in ROM/RAM card 17. As has been noted, the data consists of note (chord) code, tone length code and picking data. The note code expresses the name of a chord, e.g., Am, $C_7$, etc. or the pitch of a pure tone, e.g., C, D, etc. The tone length code expresses the length of a note, e.g., a quarter note, an eighth-note, etc. The picking data expresses the contents of picking, e.g., up-picking, down-picking and alternate picking. No note code is stored in the last address of ROM/RAM card 17, and only alternate picking data is stored. This data is read out as metronome data when the metronome mode is set.

CONSTITUTION OF FRET LED SECTION 34

Figure 8A:
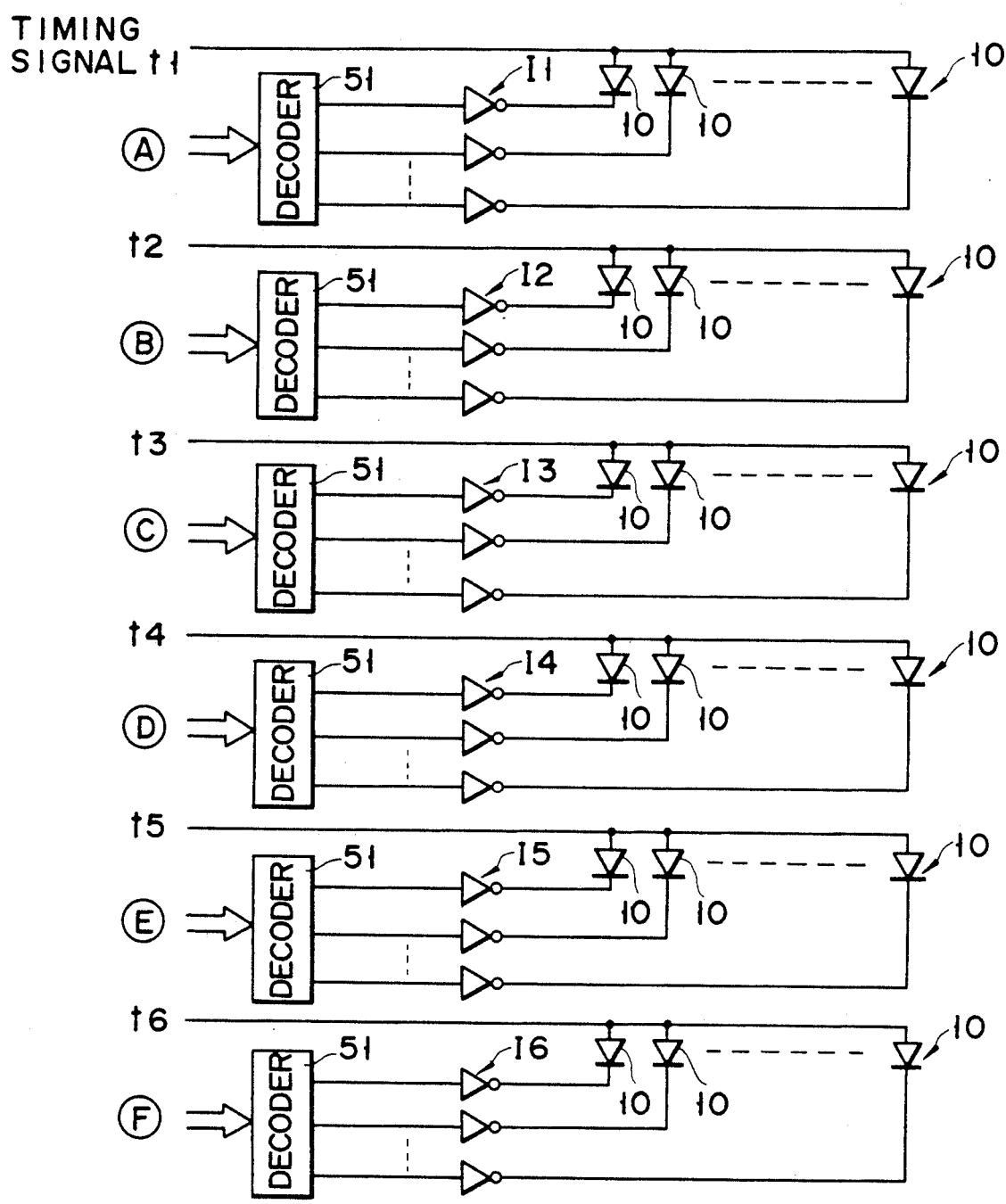
FIG. 8A is an electronic circuit diagram showing a fret LED section.
Figure 8B:
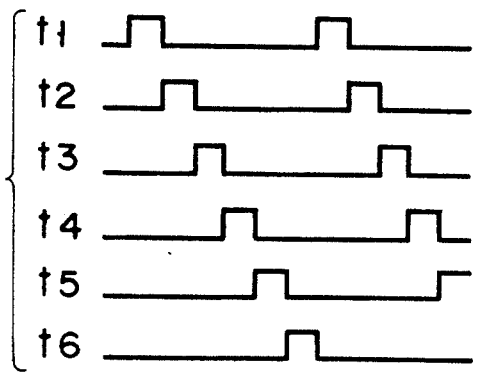
FIG. 8B is a time chart showing timing clock signals supplied to fret LEDs.

FIG. 8A shows the construction of fret LED section 34. Navigation fret codes (A) to (F) for individual strings read out from fret code generation circuit 34 are converted into 4-bit data for driving fret LEDs 10 corresponding to the open string fret position to the 15th fret position by six decoders 51. The converted data is inverted by inverters I1 to I6, and inverted data is supplied to the cathode side of 15 fret LEDs 10 for each of six fret strings 3. Thus, a first fret LED 10 in the first row is turned on if the fret code is "0001", and a 14-th fret LED 10 is turned on if the fret code is "1110". Timing pulse signals t1 to t6 provided from CPU 37 and shifted in timing from one another, as shown in FIG. 8B, are supplied to the anode side of six fret LEDs 10 provided for respective six fret strings 3. According to these timing pulse signals t1 to t6, time division display process is executed for each string.

CONSTITUTION OF TRIGGER LED CONTROL SECTION 35

FIG. 9A shows the construction of trigger LED control section 35. The string code in the note code read out from ROM/RAM card section 33 is once latched in latch 52 to be decoded into 6-bit data for respective six trigger strings 4. The individual bit data are selectively supplied to trigger LEDs 12 through OR gates 02 to 07, so that corresponding LEDs are turned on. In the case when string code representing an arpeggio is read out, corresponding trigger LEDs 12 are turned on through this time in the order representing the arpeggio.

DOWN-PICKING DISPLAY

When the picking data read out from ROM/RAM card section 33 is down-picking data, the picking data is supplied as an enable signal through AND gates A10 and A11 and OR gates 09 to 014 to AND gates A12 to A17. In consequence, a closed loop type six-stage circulation type counter is formed with AND gates A10 and A11, OR gate 08 and D-type flip-flops F8 to F13. Thus, as shown in FIG. 9B, trigger LEDs 12 are successively turned on from one corresponding to the first trigger string 4 to one corresponding to the sixth trigger string 4, and the display of down-picking play is done with the turning-on of trigger LEDs 12.

ALTERNATE PICKING DISPLAY

In the case of alternate picking data where down and up-picking data repeatedly occur alternately, the picking data is supplied as an enable signal from latch 52 through OR gates 09 to 014 to AND gates A12 to A17 and AND gates A18 to A25. A closed loop type 12-stage circulation type counter is formed with AND gate A18, D-type flip-flops F14 to F19, AND gate A19, OR gate 08 and flip-flops F8 to F13. The Q output of flip-flops F8 to F13 is supplied through AND gates A12 to A17 and OR gates 02 to 07 to trigger LEDs 12. Thus, the downward direction is first displayed with the turning-on of trigger LEDs 12. The Q output of flip-flops F14 to F19 is supplied through AND gates A20 to A25 and OR gates 02 to 07 to trigger LEDs 12. Thus, the upward direction is displayed with the turning-on of trigger LEDs 12. As a result, the downward and upward directions are alternately repeatedly displayed. In this way alternate picking is displayed.

METRONOME DISPLAY (TEMPO DISPLAY)

When mode switch 13 is set to the metronome mode, the alternate picking data is repeatedly read out from ROM/RAM card 17. Thus, six trigger LEDs 12 are displayed reciprocally according to alternate picking data. Thus, play tempo is displayed with reciprocal turning-on of trigger LEDs 12.

The speed of the play tempo can be freely set by manipulating tempo knob 15.

More specifically, CPU 37 sets tempo data corresponding to the setting of tempo knob 15 in latch 52 and supplies it to frequency division circuit 53. Thus, the frequency division of the master clock signal from CPU 37 is determined by frequency division circuit 53. The frequency divided clock signal is provided as shift clock signal to D-type flip-flops F8 to F19. The speed of picking play corresponds to the tempo. For this reason, trigger LEDs 12 are turned on successively according to the shift clock signal output timing. Thus, the speed of the picking tempo corresponds to the tempo.

UP-PICKING DISPLAY

The basic construction of the up-picking display is not shown in this embodiment. In order to display the up-picking, flip-flops F14 to F19 may have the same construction as and be of the opposite polarity to flip-flops F8 to F13. In this case, at the time of the alternate picking, flip-flops F14 to F19 and flip-flops F8 to F13 may arranged in a single closed loop.

CONSTRUCTION OF REAL TIME RECORDING SECTION 32

Figure 10:
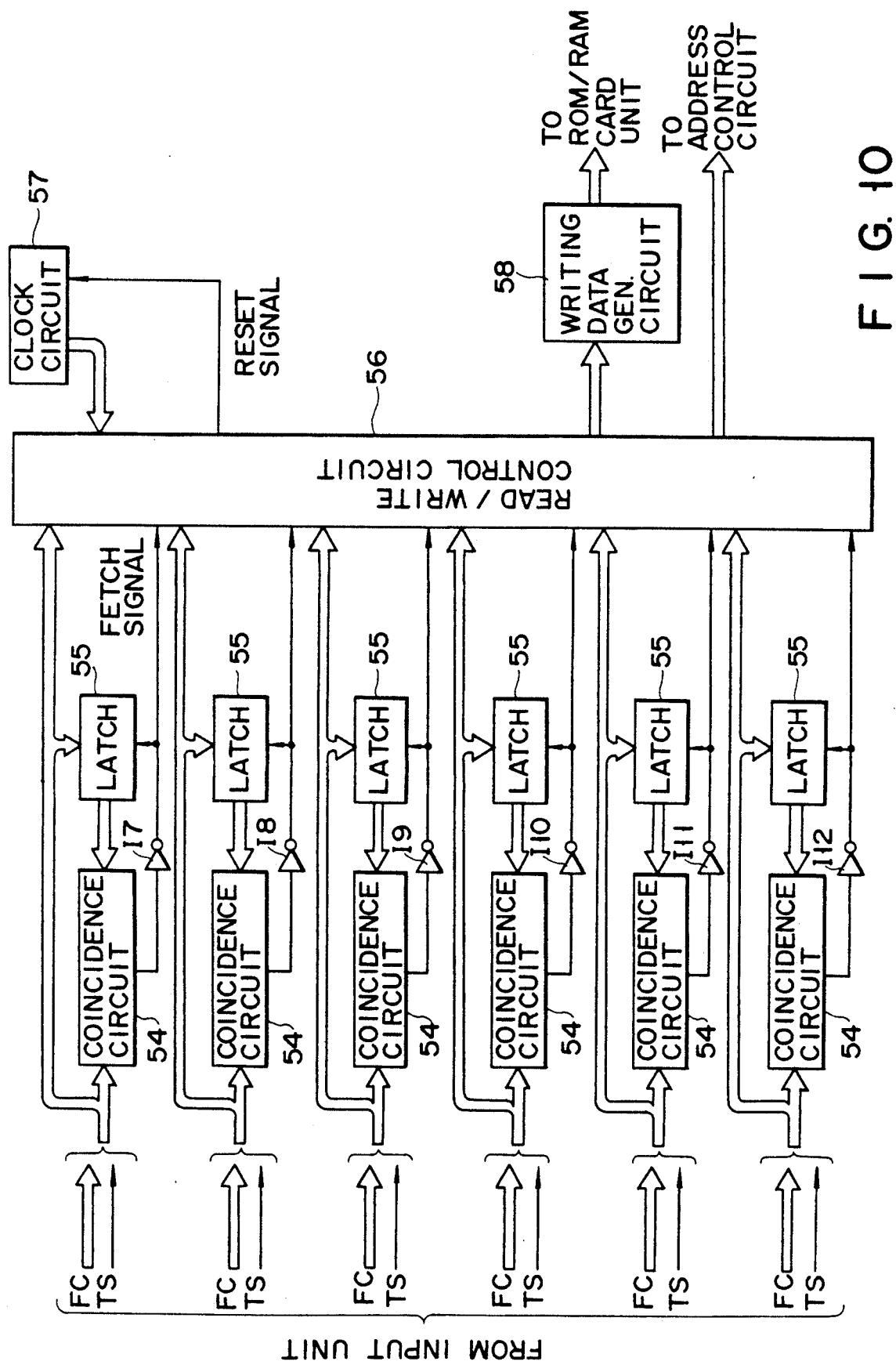
FIG. 10 is a block diagram showing a real time recording section.

FIG. 10 is a specific construction of real time recording section 32. Trigger signal Ts and fret code Fc provided for each string from input section 31 are supplied to coincidence circuits 54 provided for respective strings in real time, and also are also latched in latches 55 before being supplied to coincidence circuits 54. Each coincidence circuit 54 effects a real time check as to whether the contents of the play data provided from input section 31, i.e., trigger signal Ts, fret code Fc, and contents of play data provided previously from latches 55, i.e., trigger signal Ts and fret code Fc, coincide. If the check proves that the two contents coincide without any previous change, coincidence circuits 54 provide a coincidence signal (high level signal) after inversion through inverters I7 to I12. When the current play data is different from the preceding play data, e.g., when the fingering position is changed from a fret position at which strings have previously been depressed to a different fret position, or trigger strings 4 are newly picked, coincidence circuits 54 provide a non-coincidence signal (i.e., low level signal) after being inverted through inverters I7 to I12. The inverted output signal is supplied as a latch signal to latches 55, and is also supplied as take-in signal to read/write control circuit 56. With this take-in signal, the trigger signal Ts and fret code Fc representing the contents of the play data of this time are supplied as note code to read/write control circuit 56.

The time interval (t) from the time instant of a change in the contents of the play data (i.e., trigger signal Ts and fret code Fc) of the previous time till the time instant of a change in the contents of the play data (i.e., trigger signal Ts and fret code Fc) of this time, is counted by clock circuit 57. The count is supplied as tone length code Tc to read/write control circuit 56. When there is no change in the fret code Fc and when the trigger signal Ts is turned on or off, this trigger signal Ts and fret code Fc at this time are supplied to control circuit 56. Therefore, not only tone length data but also rest data is supplied. The note code and time interval code are supplied to writing data generation circuit 58. The note code and tone length code supplied to writing data generation circuit 58 are written in a predetermined sequence on ROM/RAM card 17 of ROM/RAM card section 33. The note code and tone length code are supplied for generating musical sounds at the time of the playback mode and for navigation display during the navigation mode. When the first to sixth strings are picked in a shorter period of time than a predetermined period of time in the absence of a change in fret position, this picking operation is judged to be an operation for chord picking. In this case, whether the picking is down-picking, up-picking or alternate picking is judged in accordance with which string direction the individual fret strings 4 have been picked from. The individual picking data are supplied to ROM/RAM card section 33 to be written in a predetermined order in ROM/RAM card 17.

In this case, write address data is supplied from read/write control circuit 56 to address control section 46 of ROM/RAM card section 33.

OPERATION OF EMBODIMENT

Now, the operation of the embodiment will be described.

A. When the Recording Mode is Set

When mode switch 13 is set to the recording mode, the write address of address control section 46 is reset to "0" (first write position) by CPU 37. Now, strings are depressed on fingerboard 1a at a desired fret position. Then, a corresponding pitch designation switch PSW is turned on. Then, corresponding trigger strings 4 are picked to turn on trigger switches TSW. As a result, the "on" signal of the pitch designation switch PSW is scanned by key scan circuit 40 to find the fret position, at which the pitch designation switch PSW is turned on. The "on" signal is rendered to be fret code Fc in a 4-bit digital form for each string by key code generation circuit 36. The "on" signal of trigger switch TSW is supplied as trigger signal Ts through flip-flops F1 to F6 to read/write control circuit 56. Every time there is a change in fret code Fc and trigger signal Ts, fret code and trigger signal Ts are supplied to read/write control circuit 56 according to a take-out signal from coincidence circuits 54. With this fret code Fc and trigger signal Ts the note code is generated to be written into ROM/RAM card 17 of ROM/RAM card section 33 through write data generation circuit 58. At this time, the time period t from the instant of a change in the fret code Fc and trigger signal Ts till the next instant of a change is counted by clock circuit 57. This time t is written as tone length code through a write data generation circuit 58 to ROM/RAM card 17 of ROM/RAM card section 33.

Thus, the parameters of an actual performance can be stored in real time in ROM/RAM card 17 in the form of note codes and tone length codes.

When trigger strings 4 are picked substantially simultaneously, the picking time difference between adjacent trigger strings 4 is reduced, and the tone length of each sound is extremely short. When the tone length is shorter than the preliminarily stored predetermined picking time, it is supplied as picking data to ROM/RAM card 17 to be written in card 17. In this case, a check as to whether the picking is uppicking, downpicking or alternate picking is done on the basis of the trigger signal, i.e., in which direction trigger strings 4 have been picked.

B. When the Navigation Mode is Set a. Display of Fret Operation Position

It is assumed that play data of one musical piece is stored in ROM/RAM card 17. The play data includes what has been stored in real time in the recording mode. In this case, the read address of address control section 46 is reset to "0" by CPU 37, and the note code at the first address in ROM/RAM card 17 is provided through read buffer memory 47 and fret code generation circuit 48. Of the note code only the fret code is generated from fret code generation circuit 48. The fret code is supplied to each coincidence circuit 49 corresponding to the string code in the note code and is also supplied through decoder 51 in fret LED section 34 to fret LEDs 10. Consequently, fret LEDs 10 corresponding to fret positions to be fingered on fingerboard 1a are turned on. With the turning-on of fret LEDs 10 the fret positions to be fingered on the fingerboard 1a are displayed.

In this way, the fret position to be fingered during the performance can be determined visually.

When strings are fingered at the correct fret position visually shown by the turning-on of fret LEDs 10, the fret code is supplied to coincidence circuits 49. When a coincidence signal is supplied from coincidence circuit 49 to flip-flop F7, an address increment signal is supplied to address control section 46 provided that a time-up signal has been provided from a timer circuit 50. According to the address increment signal, the next play data is read out for navigation display as noted above, and coincidence of the play contents read out from ROM/RAM card 17 and play contents supplied from input section 31 is checked.

b. Alternate Picking Display

Now, mode switch 13 is set to the picking mode. As a result, the read address of address control section 46 is set to "0" by CPU 37. The picking data at the first address of ROM/RAM card 17 is set in latch 52 of trigger LED control section 35. In this case, if the contents of the picking data in ROM/RAM card 17 are as shown in FIG. 7B, the picking data at the first address is alternate picking data, so that AND gates A12 to A25 are enabled. As a result, a closed loop is formed with flip-flops F8 to F19, so that a 12-stage circulation type counter is formed. Thus, a "1" signal is shifted through flip-flops F8 to F19 at the frequency of a frequency division clock signal corresponding to a preset tempo data provided from frequency division circuit 53.

While the "1" signal is being shifted from flip-flop F8 toward flip-flop F13, a "1" signal is supplied through AND gates A12 to A17 to trigger LEDs 12. Thus, trigger LEDs 12 corresponding to the respective first to sixth strings are progressively turned on in the mentioned order, whereby the direction of down-picking is displayed. While the "1" signal is being shifted from flip-flop F14 toward flip-flop F19, a "1" signal is supplied through AND gates A20 to A25 to trigger LEDs 12. Thus, trigger LEDs of FIG. 3 12 are progressively turned on from one corresponding to the sixth string to one corresponding to the first string. In this way, the up-picking direction is displayed. Consequently, the display of the alternate picking can be realized with the turning-on of flip-flops F8 to F19.

c. Down-Picking Display

The third picking data shown in FIG. 7B is down picking data. When this down-picking data is read out from ROM/RAM card 17 and set in latch 52 of trigger LED control section of FIG. 4 35, AND gates A10 to A17 are disabled this time. As a result, a closed loop is formed with flip-flops F8 to F13, and a 6-stage circulation counter is formed. This, the "1" signal is shifted progressively from flip-flop F8 to flip-flop F18 at a speed corresponding to a preset tempo. Thus, trigger LEDs 12 are turned on progressively from one corresponding to the first string to one corresponding to the sixth string.

It is to be understood that when picking trigger strings 4, the down-picking can be done smoothly and reliably by observing the direction in which trigger LEDs 12 are turned on progressively.

d. Metronome Display (Tempo Display)

When mode switch 13 is set to the metronome mode, the read address of address control section 46 is set to the last address by CPU 37. As the last address of ROM/RAM card 17, neither note code nor tone length code is stored, but only alternate picking data is stored. When the alternate picking data is read out, it is latched from ROM/RAM card 17 to latch 52 in trigger LED control section 35. Thus, like the case of the picking mode a 12-stage circulation counter is formed with flip-flops F8 to F19. Thus, a "1" signal is shifted through flip-flops F9 to F19 at a speed corresponding to the preset tempo. As a result, trigger LEDs 12 are shifted in alternate upward and downward directions.

The speed of progressive turning-on of trigger LEDs 12 is based on frequency of the frequency division clock signal from frequency division circuit 53, while the frequency division ratio of frequency division circuit 53 is based on the preset tempo of the tempo knob 15 so that is corresponds to the tempo. Thus, by changing the preset tempo of the tempo knob 15, the speed of progressive turning-on of trigger LEDs 12 is changed.

Thus, it is possible to show the tempo using trigger LEDs 12 indicating the picking direction. For this reason, trigger LEDs 12 may be used to fulfill the metronome function.

MODIFICATION

Figure 11:
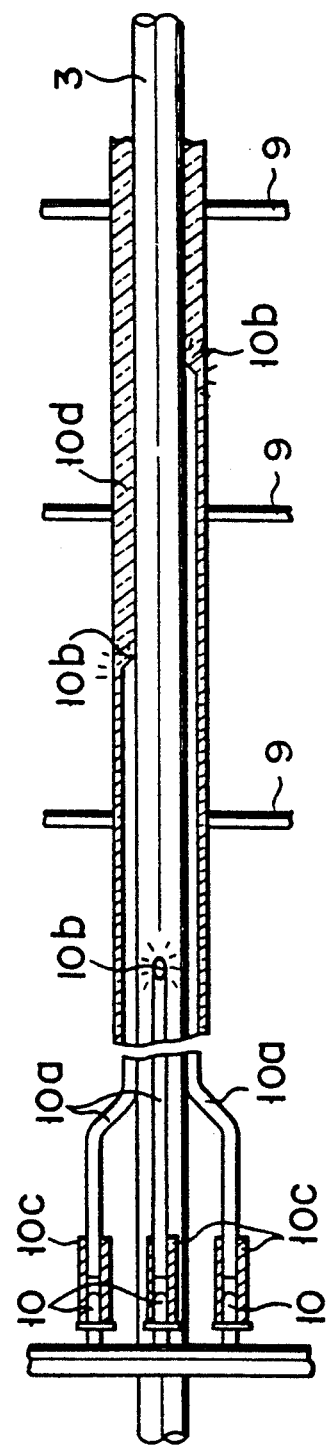
FIG. 11 is a fragmentary sectional view showing a different example of operational parameter display means.

In this embodiment, LEDs 10 and 12 are used as operation content display means and are provided in fingerboard 1a and body 2. However, this embodiment is by no means limitative. A different example is shown in FIG. 11. In this case, photoconductive members 10a containing a fluorescent material are formed in fret string 3, and light from each LED 10 is lead from one end of each photoconductive member 10a to be emitted only from a tapered surface 10b provided at the other end of the photoconductive member 10a. Reference numeral 10c designates a cylindrical shield, and reference numeral 10d transparent cap accommodating fret string 3 and each photoconductive member 10a. In this construction, the position, at which fret string 3 is to be depressed, can be confirmed by observing the state of the taper surface 10b of the photoconductive member 10a. Thus, it is possible to operate strings more speedily and reliably. Further, the LEDs may be replaced with any other display elements capable of visual display, e.g., liquid crystal display elements, lamps, etc. Further, display elements may be provided in any other place as well as those noted above so long as fret positions to be depressed and the operating direction can be visually determined.

In the above embodiment, the pitch data designation means consists of pitch designation switches PSW of a switching type, but it is also possible to use a resistance detection system (as disclosed in U.S. patent specification No. 4,235,141) or a system based on contact between a conductive string to which current is supplied and a conductive fret piece (as disclosed in U.S. patent specification 4,658,690). Further, as the operated string data input means, in addition to string trigger switches TSW of switching type as in this embodiment, a system using hole elements and magnets (as disclosed in U.S. patent specification 4,658,690 noted above), a touch switch system (as disclosed in U.S. patent specifications Nos. 4,336,734, 4,339,979, 4,248,128 and 4,078,464) and a system for blocking laser beam may be used. Further, the invention is also applicable to a guiter synthesizer (e.g., U.S. patent specification No. 4,606,255), in which a plurality of strings are provided, predetermined fret fingering positions are provided for each string, and when string picking operation is effected along with the fret fingering operation, musical sounds of pitches designated by the fret fingering operation are generated in response to the string picking operation.

Further, in this embodiment the play data memory means may be built-in ROMs or RAMS or magnetic tapes, magnetic disks or optical disks. Further, the picking data may include arpeggio data. Further, the invention is applicable to violins and cellos as well as guitars. Further, the above embodiment is by no means limitative, and various means and names are also not limitative.

What is claimed is:
1. An electronic stringed instrument, comprising:
a plurality of strings tensioned on an instrument body;
a fingerboard having a plurality of fingering operation sections, each of which corresponds to each of said plurality of strings and has a plurality of fingering operable positions;
pitch data output means for outputting pitch data corresponding to operated ones of the plurality of said fingering operable positions where a fingering operation is performed on said plurality of fingering operation sections;
string vibration sensor means for detecting string vibration of said plurality of strings;
string data output means for outputting, when an initiation of vibration of a string is detected by said string vibration sensor means, timing data representing a timing of said string vibration and string number data identifying a string from among said plurality of strings which has been initiated to vibrate; and
memory means for storing, every time said timing data is outputted by said string data output means, said pitch data outputted from said pitch data output means, and said timing data and said string number data outputted from said string data output means.

2. The electronic stringed instrument of claim 1, wherein said pitch data output means includes a plurality of pitch designation switch means, each of which is provided for each one of said plurality of fingering operable positions on said fingering operation sections.

3. The electronic stringed instrument of claim 2, wherein each of said plurality of pitch designation switch means includes a fixed contact secured to said fingerboard and a movable contact facing said fixed contact.

4. The electronic stringed instrument of claim 1, wherein said memory means includes means for digitally storing the pitch data outputted from said pitch data output means, and the timing data and the string number data outputted from said string data output means.

5. The electronic stringed instrument of claim 1, further comprising control means for controlling said memory means so that said timing data, said pitch data and said string number data stored in said memory means are read out so as to generate a musical tone having a pitch determined by both said pitch data and said string number data at a timing corresponding to said timing data.

6. The electronic stringed instrument of claim 5, further comprising musical tone generating means for generating a musical tone in response to a control operation by said control means.

7. The electronic stringed instrument of claim 6, wherein said musical tone generating means is provided within said instrument body.

8. An electronic stringed instrument comprising:
a plurality of strings tensioned on an instrument body;
a fingerboard having a plurality of fingering operation sections, each of which corresponds to each of said plurality of strings and has a plurality of fingering operable positions;
pitch data output means for outputting pitch data corresponding to a fingering operable position where a fingering operation is performed on said plurality of fingering operation sections;
string-vibration sensor means for detecting string vibration of said plurality of strings;
string data output means for outputting, every time an initiation of string vibration of said plurality of strings is detected by said string-vibration sensor means, time interval data representing a time interval between detection of an initiation of current string vibration and detection of an initiation of preceding string vibration, and string number data identifying a string from among said plurality of strings which has been initiated to vibrate; and
memory means for successively storing said time interval data and said string number data outputted from said string data output means and said pitch data outputted from said pitch data output means.

9. The electronic stringed instrument according to claim 8, further comprising control means for controlling said memory means to read out said time interval data, said pitch data and said string number data stored in said memory means and to generate a musical tone having a pitch corresponding to said pitch data in accordance with said time interval data.

10. An electronic stringed instrument according to claim 9, further comprising musical tone generating means for generating a predetermined musical tone having a pitch determined by said pitch data and said string number data read out of said memory means in response to said time interval data read out of said memory means.

11. An electronic stringed instrument of claim 10, wherein said musical tone generating means is provided in said instrument body.

12. An electronic stringed instrument comprising:
a plurality of strings tensioned on an instrument body;
a fingerboard having a plurality of fingering operation sections, each of which corresponds to said plurality of strings and has a plurality of fingering operable positions;
memory means for successively storing sets of data, each set including fingering section number data capable of individually identifying said fingering operation sections, fingering position data capable of individually identifying said fingering operable positions, and fingering operation timing data representing a time at which a selected fingering position is to be fingering operated;
fingering position indicator means mounted at each of said plurality of fingering operable positions for respectively indicating each of said plurality of fingering positions based on said sets of data; and
display driving means for reading successively said sets of data from said memory means and for driving said fingering position indicator means determined by both said fingering section number data and said fingering position data at a timing in accordance with said fingering operation timing data.

13. The electronic stringed instrument according to claim 2, wherein a plurality of other strings different from said plurality of strings are tensioned on each of said fingering operation sections.

14. The electronic stringed instrument according to claim 12, further comprising control means for controlling said memory means in synchronism with a driving operation performed by said display driving means to read out therefrom said sets of data successively and to generate, for each of said sets of data, at least one musical tone having a pitch corresponding to said fingering position data and said fingering section number data at a timing corresponding to said fingering operating timing data.

15. The electronic stringed instrument according to claim 14, further comprising musical tone generating means for generating for each of said sets of data a musical tone having a pitch determined by both said fingering position data and said fingering section number data at a timing corresponding to said fingering operation timing data read out from said memory means in accordance with a control of said control means.

16. An electronic stringed instrument according to claim 15, wherein said musical tone generating means is provided in said instrument body.

17. An electronic stringed instrument comprising:
a plurality of strings tensioned on an instrument body;
a fingerboard having a plurality of fingering operation sections, each of which corresponds to said plurality of strings and has a plurality of fingering operable positions;
memory means for storing sets of data, each set including a fingering section number data capable of individually identifying said fingering operation sections, fingering position data capable of individually identifying said fingering operable positions, and time interval data representing a time interval between a current timing at which a selected fingering operable position is to be fingering operated and a preceding timing at which said selected fingering operable operation was to be fingering operated;

fingering position indication means provided at each of said plurality of fingering operable positions; and display driving means for reading out successively said sets of data from said memory means and for driving said fingering position indication means a fingering operable position determined by both said fingering position data and said fingering section number data at a time interval corresponding to said time interval data.

18. The electronic stringed instrument according to claim 17, further comprising control means for controlling said memory means in synchronism with a driving of said display driving means to read out therefrom said sets of data successively and to generate, for each of said sets of data, at least one musical tone having a pitch corresponding to said fingering position data and said fingering section number data at a time interval corresponding to said time interval data.

19. The electronic stringed instrument according to claim 18, further comprising musical tone generating means for generating, for each of said sets of data, at least one musical tone having a pitch determined by both said fingering position data and said fingering section number data at a time interval corresponding to said time interval data read out from said memory means in accordance with a control of said control means.

20. An electronic stringed instrument according to claim 19, wherein said musical tone generating means is provided in said instrument body.

21. An electronic stringed instrument having an instrument body, comprising:

a fingerboard provided on the instrument body;

at least one string tensioned on said fingerboard;

memory means for successively storing a series of string-depressing position data respectively representing string-depressing position to be depressing operated from among a plurality of string-depressing positions on said string, and string-depressing time data representing one of (a) an operation timing at which said plurality of string-depressing position are to be operated, and (b) a time interval between a current timing at which a string-depressing position is to be operated and a preceding timing at which a string-depressing position was to be operated;

a plurality of display means provided at each of said string-depressing positions on said at least one string; and display driving means for reading out respectively corresponding ones of said string-depressing position data and said string-depressing time data, and for driving a display means from among said plurality of display means determined by said string-depressing position data at a timing corresponding to said string-depressing time data.

22. The electronic stringed instrument according to claim 21, further comprising control means for controlling said memory means in synchronism with a driving of said display driving means to read therefrom corresponding ones of said string-depressing position data and said string-depressing time data successively, and to generate at least one musical tone having a pitch corresponding to said string-depressing position data at a timing corresponding to said string-depressing time data.

23. The electronic stringed instrument according to claim 22, further comprising musical tone generating means for generating at least one musical tone having a pitch determined by said string-depressing position data at a timing corresponding to said string-depressing time data read out from said memory means in accordance with a control of said control means.

24. An electronic stringed instrument according to claim 23, wherein said musical tone generating mean is provided in said instrument body.

25. An electronic stringed instrument having an instrument body, comprising:

a fingerboard provided on the instrument body;

a plurality of string tensioned on said fingerboard;

memory means for successively storing a series of string-depressing position data respectively representing string-depressing positions to be depressing operated from among a plurality of string-depressing position on said plurality of strings, string-depressing time data representing one of (a) operation timing at which said plurality of string-depressing positions are to be operated, and (b) a time interval between a current timing at which a string-depressing position is to be operated and a preceding timing at which a string-depressing position was to be operated, and string number data identifying a string from among said plurality of strings; and a plurality of display means provided at each of said string-depressing positions on said plurality of strings; and display driving means for reading out corresponding ones of said string-depressing position data, said string-depressing time data, said string number data successively, and for driving a display means from among said plurality of display means determined by both said string-depressing position data and said string number data at a timing corresponding to string-depressing time data.

26. The electronic stringed instrument according to claim 25, further comprising control means for controlling said memory means in synchronism with a driving of said display driving means to read out therefrom corresponding ones of said string-depressing position data, and string-depressing time data, and said string number data successively, and to generate at least one musical tone having a pitch corresponding to said string-depressing position data and said string number data at a timing corresponding to said string-depressing time data.

27. The electronic stringed instrument according to claim 25, further comprising musical tone generating means for generating at least one musical tone having a pitch determined by both said string-depressing position data and said string number data at a timing corresponding to said string-depressing time data read out from said memory means in accordance with a control of said control means.

28. An electronic stringed instrument according to claim 27, wherein said musical tone generating means is provided on said instrument body.

29. An electronic stringed instrument having an instrument body, comprising:

a plurality of strings tensioned on said instrument body;

memory means for storing string number data capable of individually identifying each of said plurality of strings to be plucked, and plucking time data representing one of (a) a plucking timing of said strings to be plucked, and (b) a time interval between a current plucking timing and a preceding plucking timing;

a plurality of plucking display means provided on said instrument body respectively corresponding to said plurality of strings; and display driving means for reading out said string number data and said plucking time data and for driving said plurality of plucking display means determined by said string number data read at a plucking timing corresponding to said plucking time data.

30. An electronic stringed instrument according to claim 29, further comprising:

tempo setting means for freely setting, for a selected one of said plurality of strings, a plucking tempo between a current plucking timing of said selected sting and a preceding plucking timing of said selected string; and control means for controlling said display driving means in accordance with the plucking tempo set by said tempo setting means.

31. An electronic stringed instrument having an instrument body, comprising:

a plurality of strings tensioned on said instrument body;

memory means for storing number data capable of individually identifying each of said plurality of strings to be plucked, and plucking time data representing one of (a) plucking timing of said strings to be plucked, and (b) a time interval between a current plucking timing and a preceding plucking timing;

plucking display means provided at each of said plurality of strings; and display driving means for reading out corresponding ones of said number data and said plucking time data, and for driving the plucking display means determined by said number data read out at timing corresponding to said plucking time data.

32. An electronic stringed instrument according to claim 31, further comprising;

tempo setting means for freely setting, for a selected one of said plurality of strings, a plucking tempo between a current plucking timing of said selected string and a preceding plucking timing of said selected string; and control means for controlling said display driving means in accordance with the plucking tempo set by said tempo setting means.

33. An electronic stringed instrument comprising:

a plurality of strings tensioned on an instrument body;

memory means for storing plucking direction data representing a plucking direction and plucking timing for each of said plurality of strings to be plucking operated;

display means provided on said instrument body for visually displaying plucking direction and plucking timing of strings to be plucking operated; and display driving means for successively reading out the plucking direction data stored in said memory means and for successively driving said display means according to said plucking direction data.

34. The electronic stringed instrument according to claim 33, wherein said display means includes a plurality of display elements each provided on said instrument body corresponding to said plurality of strings.

35. An electronic stringed instrument according to claim 33, wherein said plucking direction data stored in said memory means includes at least one of first, second and third plucking direction data, the first plucking direction data representing a down plucking direction of said plurality of strings from a first string to a last string thereof, the second plucking direction data representing an up plucking direction of said strings from the last string to the first string thereof, and the third plucking direction data representing an alternating plucking direction of said plucking direction and said second plucking direction.

36. An electronic stringed instrument according to claim 33, further comprising:

tempo setting means for freely setting a plucking tempo in which an interval between a current plucking timing of the plurality of strings according to said plucking direction data and a preceding plucking timing of said plurality of strings according to said plucking direction data; and control means for controlling said display driving means in accordance with said plucking tempo set by said tempo setting means.

37. An electronic stringed instrument comprising:

a plurality of strings tensioned on an instrument body;

memory means for storing plucking direction data representing a plucking direction and plucking timing for each of said plurality of strings to be plucking operated;

display means provided on each of said plurality of strings for visually displaying plucking direction and plucking timing of said strings to be plucking operated; and display driving means for successively reading out the plucking direction data stored in said memory means and for successively driving said display driving means according to said plucking direction data.

38. An electronic stringed instrument according to claim 37, further comprising:

tempo setting means for freely setting a plucking tempo in which an interval between a current plucking timing of the plurality of strings according to said plucking direction data and a preceding plucking timing of said plurality of strings according to said plucking direction data; and control means controlling said display driving means in accordance with said plucking tempo set by said tempo setting means.

39. An electronic stringed instrument comprising:

an instrument body;

a plurality of strings tensioned on said instrument body;

string-vibrating sensor means for detecting string vibration of said plurality of strings;

string data output means for outputting, when initiation of vibration of said strings is detected by said string-vibrating sensor means, timing data representing a timing of an initiation of string vibration of the plurality of strings and number data identifying the string from among the plurality of strings which has been initiated to vibrate;

memory means for storing said timing data and said number data outputted from said string data output means;

plucking display means provided on positions of said instrument body respectively corresponding to said plurality of strings; and display driving means for successively reading out said timing data and said number data stored in said memory means and for driving said plucking display means determined by said number data at a timing corresponding to said timing data.

40. An electronic stringed instrument according to claim 39, further comprising:

tempo setting means for freely setting a plucking tempo between a current plucking timing of a predetermined string to be plucked and preceding plucking timing of a predetermined string to be plucked; and control means for controlling said display driving means in accordance with the plucking tempo set by said tempo setting means.

41. An electronic stringed instrument comprising:

an instrument body;

a plurality of strings tensioned on said instrument body;

string-vibrating sensor means for detecting string vibration of said plurality of strings;

string data output means for successively outputting, when an initiation of vibration of a string is detected by said string-vibrating sensor means, time data representing a timing of the string vibrating and number data identifying a string from among said plurality of strings which is initiated to vibrate;

memory means for storing said timing data and said number data outputted from said string data output means;

plucking display means provided at a predetermined position of said plurality of strings; and display driving means for reading out successively said timing data and said number data stored in said memory means and for driving said plucking display means determined by said number data at a timing corresponding to said timing data.

42. An electronic stringed instrument according to claim 41, further comprising:

tempo setting means for freely setting a plucking tempo in which an interval between a current plucking timing of a predetermined string from among said plurality of strings and a preceding plucking timing of said predetermined string; and control means for controlling said display driving means in accordance with the plucking tempo set by said tempo setting means.

43. An electronic stringed instrument comprising:

a fingerboard provided on an instrument body;

at least one string tensioned on said fingerboard;

string-vibrating sensor means for detecting string vibration of said at least one string;

data output means for successively outputting, when said at least one string is vibrated while a predetermined position of said string is depressed, pitch data corresponding to said depressed position, timing data representing one of (a) a timing of vibration initiation of said at least one string, and (b) an interval of time between an initiation of current string vibration and an initiation of preceding string vibration, and number data identifying said at least one string which has been initiated to vibrate; and memory means for storing said pitch data, said timing data and said number data outputted from said output means.

44. An electronic stringed instrument according to claim 43, further comprising control means for reading out said pitch data, said timing data, and said number data stored in said memory means to generated a musical tone having a pitch determined by said pitch data and said number data in accordance with said timing data.

45. An electronic stringed instrument according to claim 43, further comprising:

depressing display means provided on each of a plurality of positions on said at least one string to be depressed; and display driving means for reading out said pitch data, said timing data and said number data stored in said memory means and for driving said depressing display means determined by both said pitch data and said number data in accordance with said timing data.

46. An electronic stringed instrument according to claim 43, further comprising:

depressing display means provided at a plurality of positions of said fingerboard corresponding to a plurality of positions on said at least one string; and display driving means for reading out said pitch data, said timing data and said number data stored in said memory means, and for driving said depressing display means determined by both said pitch data and said number data in accordance with said timing data.

47. An electronic stringed instrument, comprising:

a plurality of strings respectively having a plurality of fingering operable positions;

pitch data output means for outputting pitch data corresponding to operated ones of said plurality of fingering operable positions where a fingering operation is performed on said plurality of strings;

string vibration sensor means for detecting string vibration of said plurality of strings;

string data output means for outputting, when an initiation of vibration of a selected string from said plurality of strings is detected by said string vibration sensor means, timing data representing one of (a) a timing of vibration of said selected string, and (b) a time interval between a detection timing of an initiation of current string vibration and a detection timing of an initiation of preceding string vibration, and string number data identifying said selected string which has been initiated to have said string vibration; and memory means for successively storing, every time when said timing data is outputted by said string data output means, said pitch data outputted from said pitch data output means, and said timing data and said string number data outputted from said string data output means.

48. An electronic stringed instrument, comprising:

a plurality of strings tensioned on an instrument body;

a fingerboard having a plurality of fingering operation sections, each of which corresponds to each of said plurality of strings and has a plurality of fingering operable positions;

pitch data output means for outputting itch data corresponding to operated ones of the plurality of said fingering operable positions where a fingering operation is performed on said plurality of fingering operation sections;

string vibration sensor means for detecting string vibration of said plurality of strings;

timing data output means for outputting, when an initiation of vibration of a string is detected by said string vibration sensor means, timing data representing a timing of said string vibration; and memory means for storing, every time said timing data is outputted by said timing data output means, said pitch data outputted from said pitch data output means and said timing data outputted from said timing data output means.

49. The electronic stringed instrument of claim 48, wherein said pitch data output means includes a plurality of pitch designation switch means, each of which is provided for each one of said plurality of fingering operable positions on said fingering operation sections.

50. The electronic stringed instrument of claim 49, wherein each of said plurality of pitch designation switch means includes a fixed contact secured to said fingerboard and a movable contact facing said fixed contact.

51. The electronic stringed instrument of claim 48, wherein said memory means includes means for digitally storing the pitch data outputted from said pitch data output means, and the timing data outputted from said timing data output means.

52. The electronic stringed instrument of claim 48, further comprising control means for controlling said memory means so that said timing data and said pitch data stored in said memory means are read out so as to generate a musical tone having a pitch determined by said pitch data at a timing corresponding to said timing data.

53. The electronic stringed instrument of claim 52, further comprising musical tone generating means for generating a musical tone in response to a control operation by said control means.

54. The electronic stringed instrument of claim 53, wherein said musical tone generating means is provided within said instrument body.

55. An electronic stringed instrument comprising:
a plurality of strings tensioned on an instrument body;
a fingerboard having a plurality of fingering operation sections, each of which corresponds to each of said plurality of strings and has a plurality of fingering operable positions;
pitch data output means for outputting pitch data corresponding to a fingering operable position where a fingering operation is performed on said plurality of fingering operation sections;
string-vibration sensor means for detecting string vibration of said plurality of strings;
time interval data output means for outputting, every time an initiation of string vibration of said plurality of strings is detected by said string-vibration sensor means, time interval data representing a time interval between detection of an initiation of current string vibration and detection an initiation of preceding string vibration; and
memory means for successively storing said time interval data outputted form said time interval data output means and said pitch data outputted from said pitch data output means.

56. The electronic stringed instrument according to claim 55, further comprising control means for controlling said memory means to read out said time interval data and said pitch data stored in said memory means, and to generate a musical tone having a pitch corresponding to said pitch data in accordance with said time interval data.

57. An electronic stringed instrument according to claim 56, further comprising musical tone generated means for generating a predetermined musical tone having a pitch determined by said pitch data read out of said memory means in response to said time interval data read out of said memory means.

58. An electronic stringed instrument of claim 57, wherein said musical tone generating means is provided in said instrument body.

59. An electronic stringed instrument comprising:
a fingerboard provided on an instrument body;
at least one string tensioned on said fingerboard;
string-vibrating sensor means for detecting string vibration of said at least one string;
data output means for successively outputting, when said at least one string is vibrated while a predetermined position of said string is depressed, pitch data corresponding to said depressed position, timing data representing one of (a) a timing of vibration initiation of said at least one string, and (b) an interval of time between an initiation of current string vibration and an initiation of preceding string vibration; and
memory means for successively storing said pitch data and said timing data outputted from said output means.

60. An electronic stringed instrument according to claim 59, further comprising control means for reading out said pitch data and said timing data stored in said memory means to generate a musical tone having a pitch determined by said pitch data in accordance with said timing data.

61. An electronic stringed instrument, comprising:
a plurality of strings respectively having a plurality of fingering operable positions;
pitch data output means for outputting pitch data corresponding to operated ones of said plurality of fingering operable positions where a fingering operation is performed on said plurality of strings;
string vibration sensor means for detecting string vibration of said plurality of strings;
string data output means for outputting, when an initiation of vibration of a selected string from said plurality of strings is detected by said string vibration sensor means, timing data representing one of (a) a timing of vibration of said selected string, and (b) a time interval between a detection timing of an initiation of current string vibration and a detection timing of an initiation of preceding string vibration; and
memory means for successively storing, every time when said timing data is outputted by said string data output means, said pitch data outputted from said pitch data output means and said timing data outputted from said string data output means.

* * * * *

UNITED STATES PATENT AND TRADEMARK OFFICE
CERTIFICATE OF CORRECTION

PATENT NO. : 5,040,447
DATED : August 20, 1991
INVENTOR(S) : MURATA et al

It is certified that error appears in the above-identified patent and that said Letters Patent is hereby corrected as shown below:

TITLE PAGE -

Section [56] References Cited, insert the following references as indicated below:

<u>U.S. PATENT DOCUMENTS</u>

4,080,867   3/1978   Ratanangsu
4,286,495   9/1981   Roof

<u>FOREIGN PATENT DOCUMENTS</u>

54-161924   12/1979   Japan

Signed and Sealed this

Fifteenth Day of June, 1993

Attest:

MICHAEL K. KIRK

*Attesting Officer*   Acting Commissioner of Patents and Trademarks